US007239319B2

(12) United States Patent
Loop

(10) Patent No.: US 7,239,319 B2
(45) Date of Patent: Jul. 3, 2007

(54) RENDERING OUTLINE FONTS

(75) Inventor: Charles Loop, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 4 days.

(21) Appl. No.: 10/928,608

(22) Filed: Aug. 27, 2004

(65) Prior Publication Data

US 2006/0044312 A1 Mar. 2, 2006

(51) Int. Cl.
*G06T 11/00* (2006.01)
(52) U.S. Cl. .................................... 345/467
(58) Field of Classification Search ........... 345/468, 345/469, 469.1, 470, 467
See application file for complete search history.

(56) References Cited

U.S. PATENT DOCUMENTS 5,301,267 A * 4/1994 Hassett et al. ............. 345/469
5,309,521 A * 5/1994 Matsukawa ................ 345/469
5,594,852 A * 1/1997 Tankelevich ............... 345/441
5,638,503 A * 6/1997 Hoel ........................ 345/442
5,790,126 A * 8/1998 Ballard et al. ............. 345/468
5,818,459 A * 10/1998 Kurumida .................. 345/442
5,859,647 A * 1/1999 Kurumida .................. 345/442
6,151,032 A * 11/2000 Cheng ...................... 345/469
6,501,475 B1 * 12/2002 Cheng ...................... 345/467
6,917,369 B2 * 7/2005 Perry et al. ................ 345/589

OTHER PUBLICATIONS

Xiao-Shan Gao, Approximate Implicitization of Planar Parametric Curves using Quadratic Splines, Dec. 2002, Mathematics-Mechanization Research Center (MMRC) Institute of Systems Sciences, AMSS Academia Sinica, 52-63.*

* cited by examiner

*Primary Examiner*—Ulka J. Chauhan
*Assistant Examiner*—Daniel Washburn

(57) ABSTRACT

Rendering an outline font. Rendering an outline font by adding Bezier control points to further define a contour of an outline font and applying an in or out test to determine if a pixel falls within the contour of an outline font.

20 Claims, 8 Drawing Sheets

Enlarged Bit Mapped Image 101

Enlarged Vector Drawn Image 105

RENDERING OUTLINE FONTS

TECHNICAL FIELD

The application relates generally to the computer generation of fonts, typefaces and graphics.

BACKGROUND OF THE INVENTION

The rendering of text and graphics is a fundamental visual aspect of a graphical user interface. Powerful graphics hardware capable of sophisticated pixel processing is tending to become standard equipment on personal computers, gaming systems and the like. Using graphics hardware to improve the visual appearance of text and graphics tends to have a positive visual impact on system performance.

Furthermore, the animation or distortion of text in multimedia web applications tends to negate the economy of current font caching mechanisms. The use of pixel processors tends to provide opportunities to combine flexibility with high performance in rendering outline fonts and vector graphics.

SUMMARY OF THE INVENTION

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present invention provides a resolution independent method of rendering outline fonts, including Open Type™ and TrueType™ font outlines. This approach uses an in-out test to determine if a pixel belongs to the interior or exterior of the screen space projection of the font outline. This test is based on a relationship between the parametric and implicit form of a rational quadratic curve.

Many of the attendant features of this invention will be more readily appreciated as the same becomes better understood by reference to the following detailed description considered in connection with the accompanying drawings.

DESCRIPTION OF THE DRAWINGS

These and other features and advantages of the present invention will be better understood from the following detailed description read in light of the accompanying drawings, where.

Like reference numerals are used to designate like parts in the accompanying drawings.

DETAILED DESCRIPTION OF THE INVENTION

The detailed description provided below in connection with the appended drawings is intended as a description of the present embodiments of the invention and is not intended to represent the only forms in which the present invention may be constructed or utilized. The description sets forth the functions of the invention and the sequence of blocks for constructing and operating the invention in connection with the illustrated embodiments. However, the same or equivalent functions and sequences may be accomplished by different embodiments that are also intended to be encompassed within the spirit and scope of the invention.

Although the present invention is described and illustrated herein as being implemented in a True Type™ system, the system described is provided as an example and not a limitation. As those skilled in the art will appreciate, the present invention is suitable for application in a variety of different types of outline font or vector based font systems. Those skilled in the art will also realize that the present invention may also be applied to the generation of any type of vector based graphics.

An exemplary embodiment of the present invention is directed to a resolution independent method of rendering outline fonts. The invention may be applied to the rendering of TrueType™ fonts, PostScript™ fonts, vector fonts, and vector graphics. The exemplary embodiments of the invention utilize the programmable pixel shader capability of graphics processing units (GPU). Those skilled in the art will appreciate that the application of the techniques described may be applied to other equivalent processors, including high performance central processing units (CPUs), mainframe computers, DSPs, and the like that provide similar functionality.

In the conventionally produced font images, curved outlines of a font may not appear curved at all viewing distances and resolutions. For example, the letter "O" may appear to be a square at some resolutions. The present invention tends to provide a resolution independent method of rendering the outlines in outline fonts. This approach uses an in-out test to determine if a pixel belongs to the interior or exterior of the screen space projection of the font outline. This test is based on a relationship between the parametric and implicit form of a rational quadratic curve.

Figure 1:
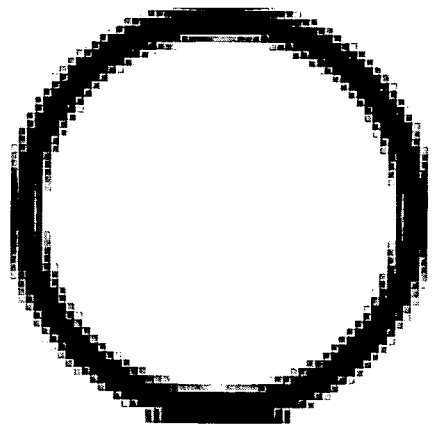
FIG. 1 illustrates the display of vector drawn images and bit mapped images.
Figure 1:
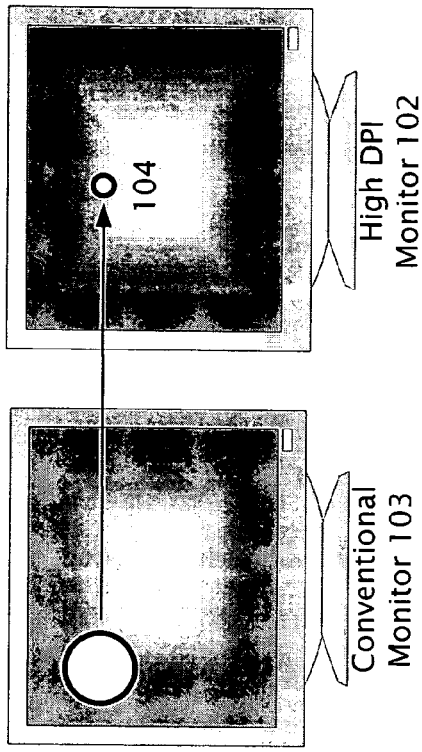
Figure 1:
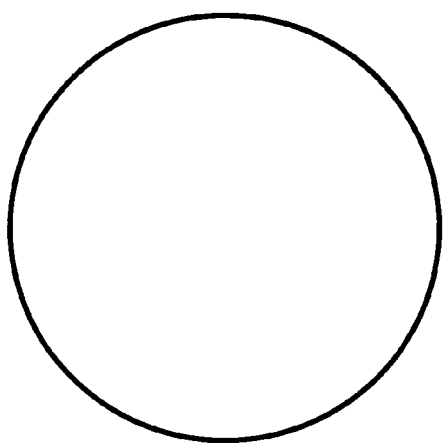
Figure 1:
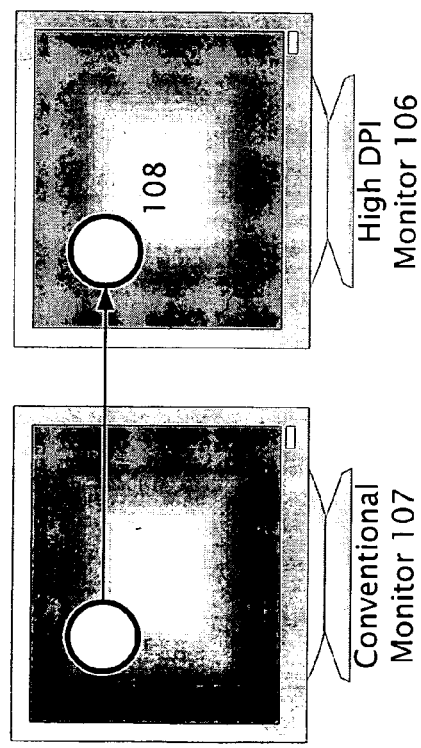

FIG. 1 illustrates the display of vector drawn images and bit mapped images. Those skilled in the art will appreciate that bit mapped objects are made up of a collection of pixels that are stored and displayed. When enlarging these bit mapped objects the image appears grainy 101 since the number of pixels is fixed. When a bit mapped image is displayed on a high dot per inch ("DPI") monitor 102, instead of a conventional monitor 103, the resulting object may be too small to see 104. However, bit mapped images are typically easy to display and tend not to be demanding on a CPU used to generate them.

Vector based objects are drawn from a mathematical description and tend to scale better than bit mapped images. When a vector based image is enlarged 105 it tends to look as good as the original image, since the number of pixels is increased accordingly. Similarly, when a vector based image is displayed on a high DPI monitor 106 its size and appearance 108 appear similar to that when displayed on a conventional monitor 107. However, vector based objects tend to take more processing than a bit mapped image.

A vector based image may be any shape that can be generated from a mathematical description. For example outline fonts are vector based and generated from a description of the curves that make up the type face being generated. A description of an outline font may include information giving the number of contours making up the letter, and the definition of the points on each contour. Additional information may also be added to the description, including identification of points that actually lie on the curve and those that do not.

Texture mapping is used to warp a raster image of the font according to the perspective viewing transformation. Pixilation artifacts appear if the font is viewed too closely. Additionally, the size of these texture images might be large if these artifacts are attempted to be avoided. In the approach utilized these drawbacks tend not to be present as the pixel shader is used to determine shape boundaries.

Figure 2:
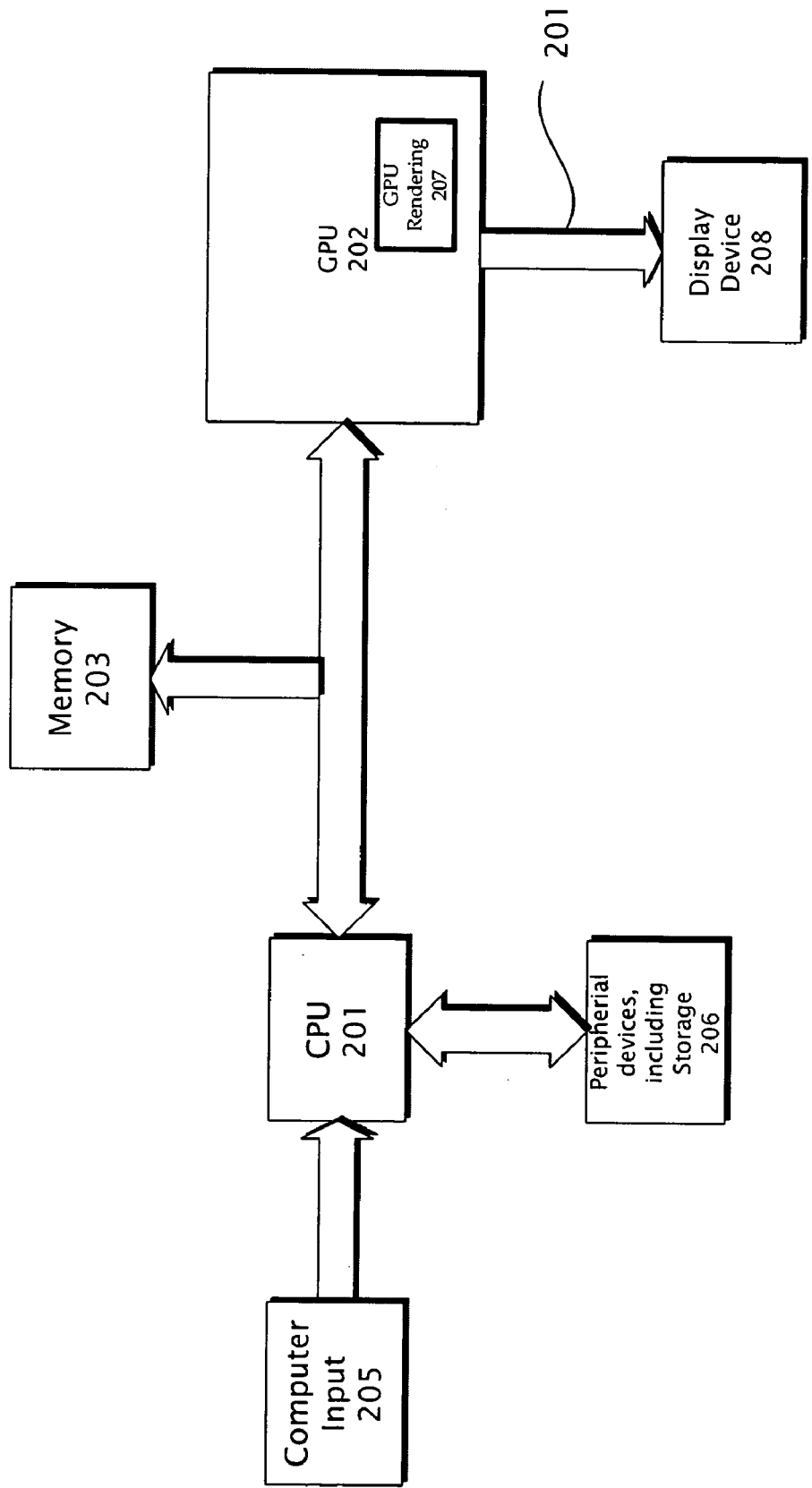
FIG. 2 is a block diagram of a computer processor system suitable for the graphics processing unit rendering of outline fonts and other equivalent vector based objects.

FIG. 2 is a block diagram of a computer processor system suitable for the graphics processing unit rendering of outline fonts and other equivalent vector based objects. Computers, game consoles, computing systems and the like may include an auxiliary processor called a GPU 202. GPU stands for "Graphics Processing Unit." Like the CPU (Central Processing Unit) 201, the GPU may be a single-chip processor.

In an exemplary computing system a CPU 201 is coupled with a GPU 202 including the capability of rendering of vector based fonts, or objects 207. In the computer system the GPU 202 with rendering of vector based fonts, or objects 207 may be programmed to accept data and commands from the CPU 201. A memory 203 is coupled to CPU 201 and GPU 202 with rendering of vector based fonts, or objects 207. The memory 203 provides storage and buffering to the CPU 201 and GPU 202 with rendering of vector based fonts, or objects 207 as needed. The GPU with rendering of vector based fonts, or objects 207 includes an internal graphics pipeline that is coupled via an external conventional graphics pipeline 201 that is typically utilized to transmit graphical information to a display device 208.

The GPU is used primarily for computing 3D functions including lighting,effects, object transformations, and 3D motion. Because these types of calculations may be rather taxing on the CPU, the GPU can help the computer run more efficiently. The use of a GPU in conjunction with a central processing unit ("CPU") can improve overall computing system performance.

In particular objects may be displayed as bit mapped objects or vector based objects. In typical computer systems bit mapped objects have been used in the past, due to processor limitations. With the advent of the processing power of GPUs better displays tend to be produced with vector based objects.

In an embodiment of the invention GPU rendering of vector based fonts may be used in the graphics layers of a computer operating system ("OS") to render vector based shapes. In a computer system such an operating system would tend to improve the display of objects, such as icons, that have been traditionally displayed as bit mapped objects. Such a computer system having a high resolution display, or the equivalent would tend to provide a more visually appealing, and flexible approach to the display of objects on the display device. Those skilled in the art would realize that such a computer system equipped with a display device having a conventional resolution would tend to benefit from such a GPU rendering of vector based objects such as outline fonts, vector drawn icons and the like.

The embodiments tend to provide a resolution independent method of rendering the outlines of vector based fonts or objects using the programmable pixel shader capability of a graphics processing unit (GPU). The embodiments utilize an "in or out" test to determine if a pixel belongs to the interior or exterior of the outline of a character in the particular font. Or as is known to those skilled in the art whether a pixel belongs on the interior or the exterior of the outline of a screen space projection of the font outline. The in or out test is based on a relationship between the parametric and implicit form of a rational quadratic curve. Using the pixel shader to determine if a pixel belongs to a font outline tends to be resolution independent, and has a compact geometric representation.

The rendering of a font may thus be achieved by using the GPU to evaluate an implicit function for the purpose of region filling as will be explained below. For rendering fonts integral quadratics may be utilized. However rational quadratics may be utilized to render other shapes including circles and ellipses.

Resolution independence means that curved outlines of the font will appear curved at any viewing distance; a qualitative improvement over existing techniques. Prior to rendering, a font outline is triangulated into a small, fixed set of triangles that depend only on the design of the outline geometry, not its rendered image. The in-out test requires only a few floating operations that can be carried out independently over several pixel processing units in parallel.

Computer input 205 to the CPU 201 is provided by conventional methods, including keyboards and the like. The CPU 201 may utilize one or more peripheral devices (in addition to memory 203), including storage 206 to load and, or store data and instructions. Storage may include magnetic disks, CDs, tapes and the like.

Those skilled in the art will realize that storage devices utilized to store program instructions can also be distributed across a network. For example a remote computer may store a tool such as the adaptive instrumentation runtime monitoring and analysis software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Figure 3:
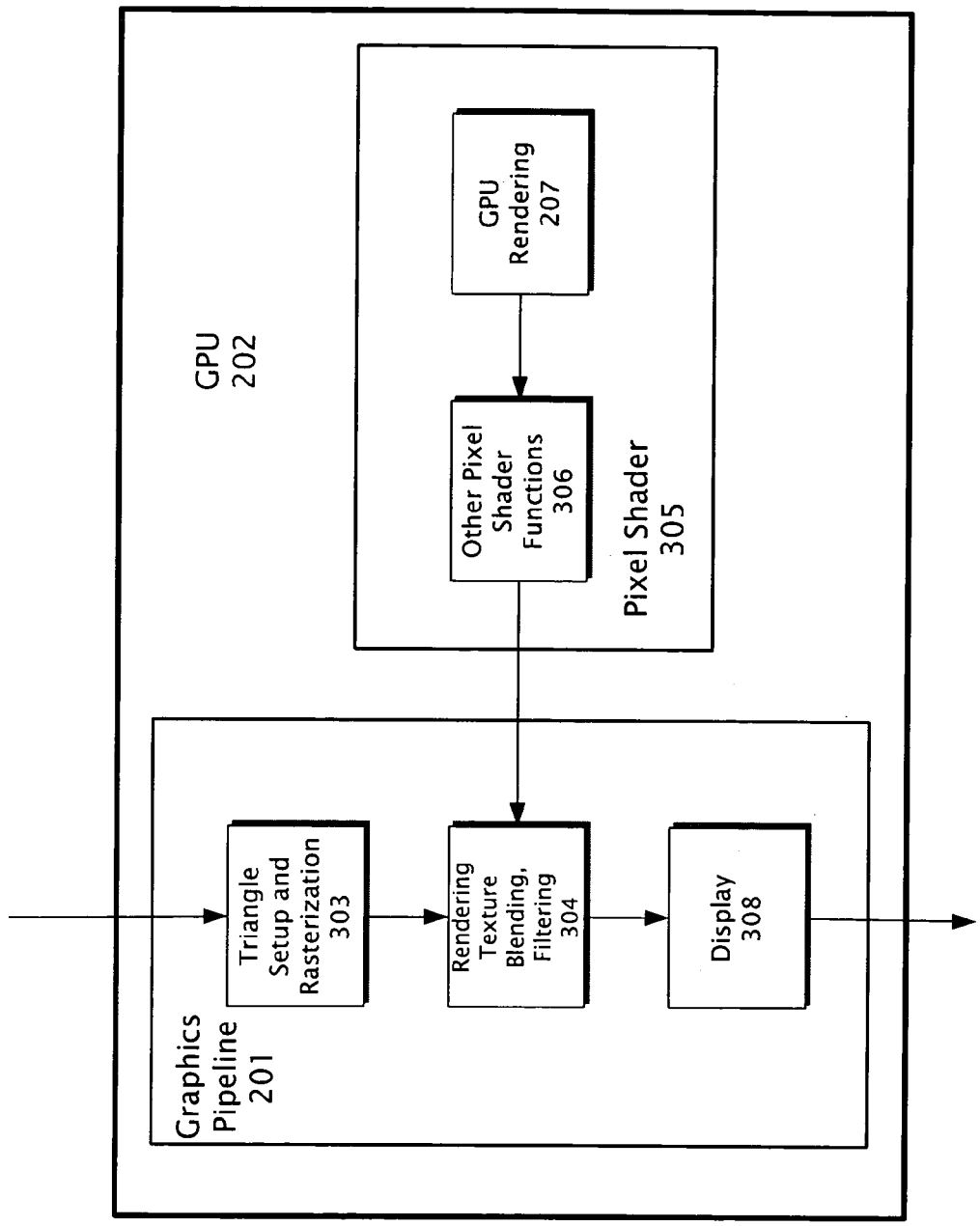
FIG. 3 is a flow diagram of the graphics pipeline 201, including input contributed by a graphics processing unit, or geometry processing unit.

FIG. 3 is a flow diagram of the graphics pipeline 201, including input to the graphics pipeline contributed by a graphics processing unit, or geometry processing unit ("GPU") 202 and the GPU Rendering 207. Typically computer graphics are generated by assembling polygons, including triangles to form a desired image. Graphics hardware for rendering outline fonts may include a programmable pipeline that tends to speed the rendering of natural looking shapes assembled from the polygons. In rendering graphics the programmable pipeline utilizes output from the conventionally constructed vertex shaders (not shown) and The pixel shaders 305 that includes the GPU rendering of graphics and fonts 207. As will be appreciated by those skilled in the art, a conventional vertex shader program executes on each vertex of a conventional graphics primitive, while a pixel shader program tends to execute on every pixel of a rasterized triangle. That is the pixel shader function provides a place in the font or graphics rendering process where the GPU rendering process 207 may be applied to control the rendering of individual pixels.

In the conventional operation the data encapsulated in a vertex may be a user defined collection of floating point numbers, much like a "c" data structure. The vertex shader program, or process, can modify this, or invent new data, and pass the result along to a pixel shader. The input to a pixel shader may be an interpolation of the vertex data on the vertices of a triangle. This interpolation of vertex data tends to be non-linear, involving a projective transform that maps a triangle from the model in the computer to the image displayed on the screen, or equivalent display device.

Accordingly at block 303 the conventional process of triangle setup and rasterization have typically been performed utilizing conventional techniques known to those skilled in the art. At block 304 rendering texture blending, and filtering is typically performed that include contributions from the GPU rendering process 207. The GPU process 202 includes contributions from the sub-processes of pixel shading 305, and vertex shading (not shown).

The pixel shader unit 305 is where computations to produce a final displayed image can occur. The pixel shader units can be active in the processing of an image to be displayed, where control over individual pixels may be exerted. For example in the GPU 202 the pixel shader 305 can be configured to be preceded by a vertex shader that may calculate and provide light source orientation information that may, in turn, be used by the pixel shader to calculate per pixel lighting.

The pixel shading sub-process 305 includes conventional pixel shading processes 306, and contributions from an embodiment of the GPU rendering of vector based fonts ("GPU rendering") 207. In alternative embodiments GPU rendering may include GPU rendering of outline fonts, or GPU rendering of other objects suitable for vector based definition. Returning to block 304, the output of this block is the signal to be displayed 308. The input to block 308 is typically an array of pixels.

Figure 4:
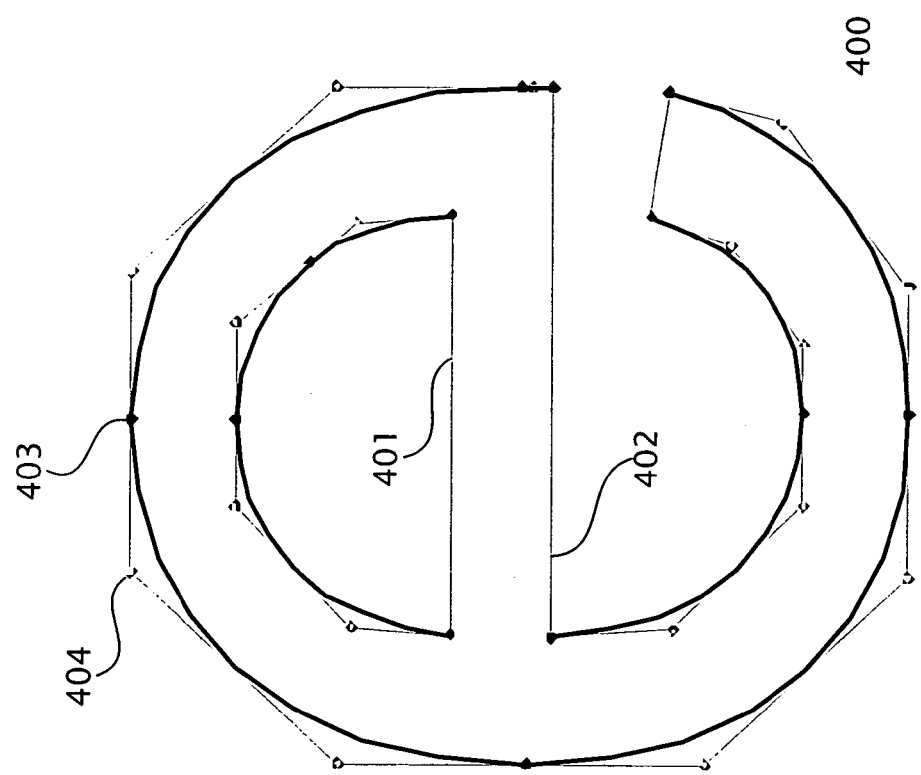
FIG. 4 is an illustration of a two contour outline font.

FIG. 4 is an illustration of a two contour outline font 400. The font outline consists of a set of ordered contours 401, 402; each contour represents a cyclic component of the character. With clockwise ordering, all of the interior of an outline is to the right of the contour path. Those skilled in the art will appreciate that here the path has been arbitrarily divided into an inside and an outside region, with the right side of the contour being considered to be the inside. The path may be encoded by a collection of 2D points in model space, each point is either on-curve 403 or off-curve 404. On curve points create sharp discontinuities; off-curve points are treated as quadratic B-spline control points, allowing for smoothly curved portions of an outline.

Figure 5:
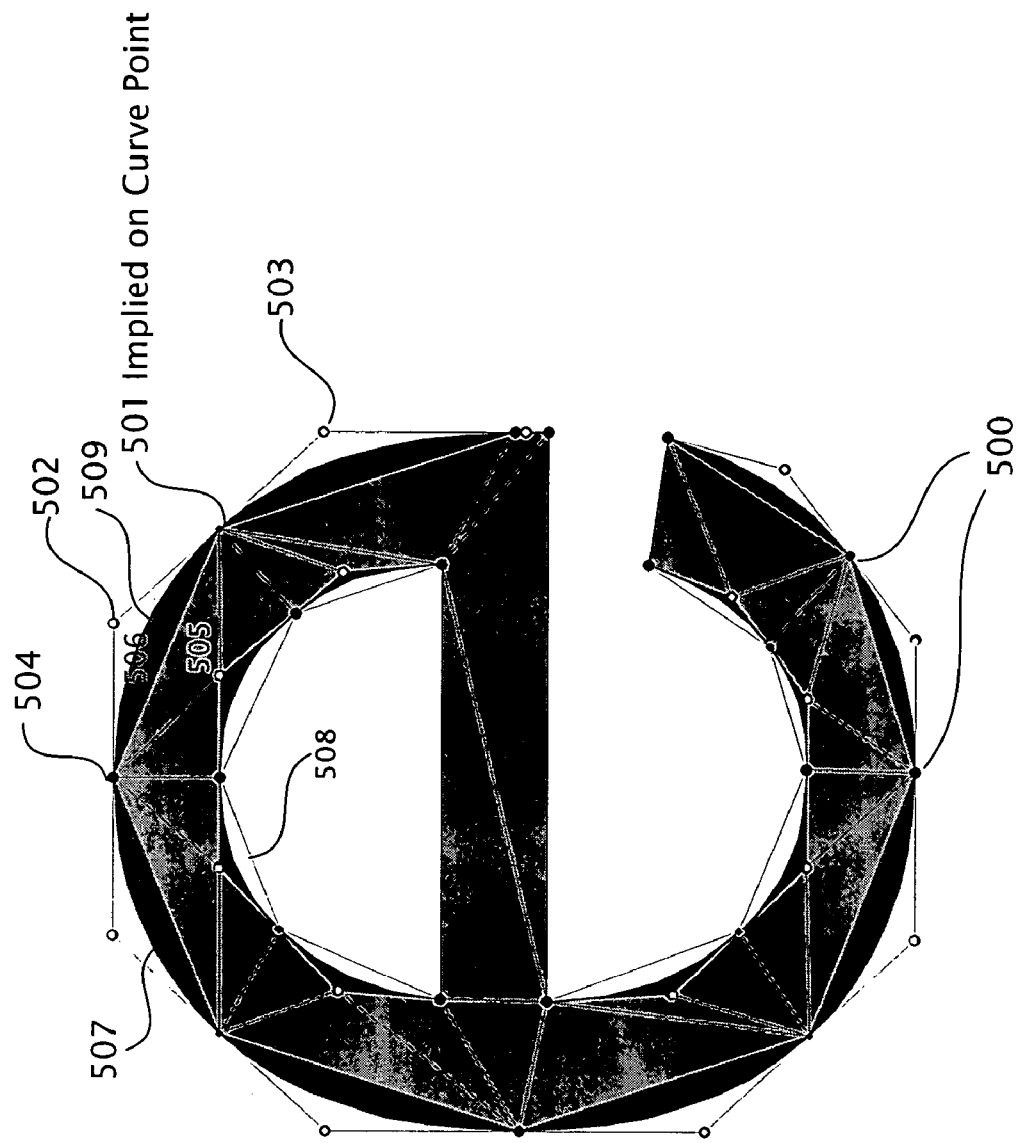
FIG. 5 is an illustration of the two contour outline font triangulated together with implied on-curve points.

FIG. 5 is an illustration of the two contour outline font triangulated together with implied on-curve points 500. At the midpoint 501 between adjacent off-curve points 502, 503, lies an implied on-curve point 501 corresponding to the endpoints of the Bézier representation of the underlying quadratic curve. The font outline together with the implied on-curve points are triangulated subject to the constraint that each off-curve point 502 and pair of adjacent on-curve points 501, 504 forms a triangle. This constraint insures that each quadratic Bézier curve segment 509 lies entirely in the triangle formed by its Bézier control points 502, 501, 504 and has endpoints 501, 504. The triangles are either entirely on the interior 505 of the font outline 507, or they contain a curve segment 506. Those triangles that contain a curve segment 506, 508 are rendered using a pixel shader program that implements the in-out test.

The In or Out Test

Figure 6:
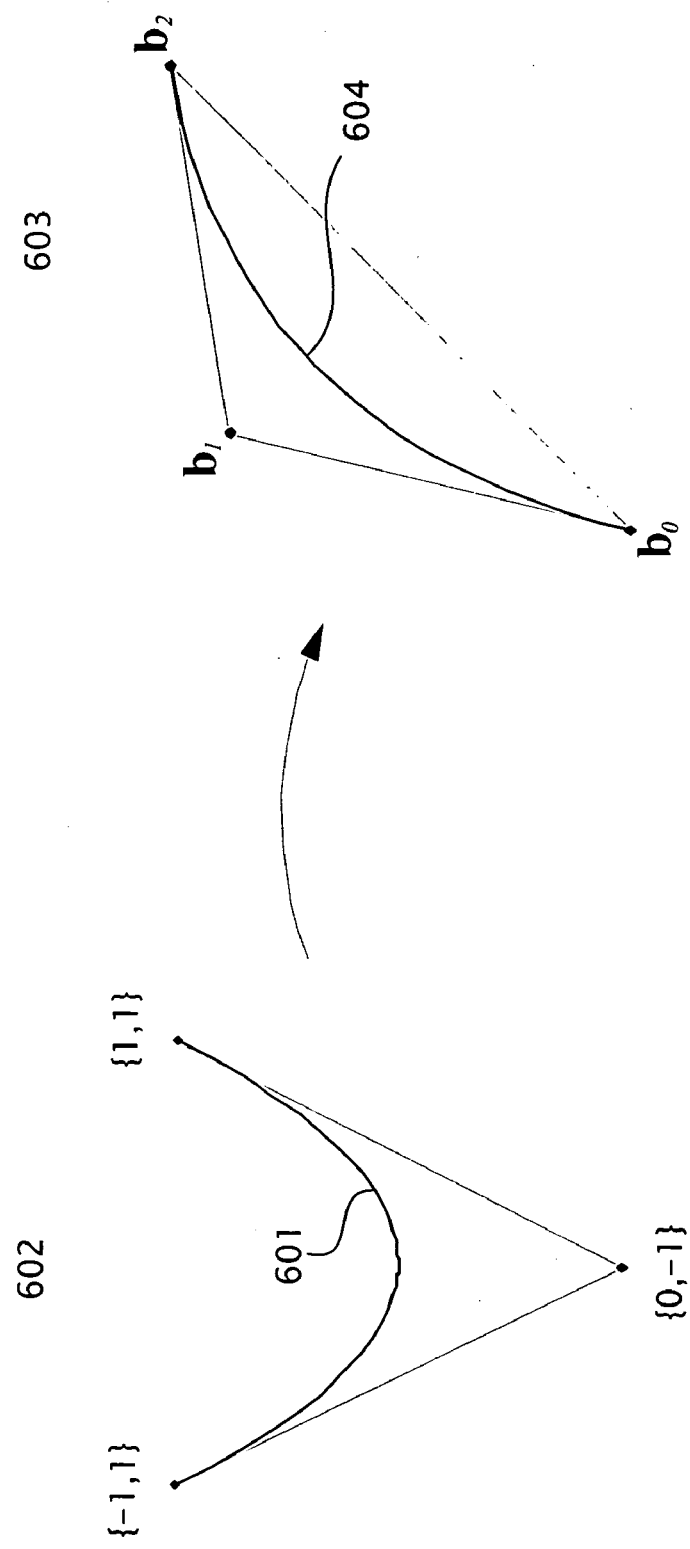
FIG. 6 is an illustration of the mapping of a canonical curve element from texture space to screen space.

The in or out test is applied to the quadratic Bézier curve segments (for example 508) laying within the control points (for example 501, 502, 504) having the parametric form:

$$B_i(t) = b_{i-1}(1-t)^2 + 2b_i(1-t)t + b_{i+1}t^2, \quad (0.1)$$

where $t \in [0, 1]$, and $b_i$ corresponds to an off-curve point (for example 502, also $b_i$ of FIG. 6), $b_{i-1}$ and $b_{i+1}$ correspond to adjacent on-curve points (for example 501 and 504, and also $b_0$ and $b_2$ of FIG. 6). Note that $B_i(t)$ is only defined when $b_i$ is an off-curve point, and it is assumed the implied on-curves belong to the outline.

The outline points $b_i$ are transformed from the mathematical model to the display, or screen space via a projective transform P. Projective transform P may be represented by a 3×3 matrix. It may be that P is the composition of several standard graphical transforms that involve 4×4 matrices. But ultimately the mapping from model to screen space may be a projective mapping between two dimensional spaces.

Screen space, or display, points $q_i = p_i \cdot P$ are also found. Where outline points $p_i = \{p_{i,x}, p_{i,y}, 1\}$ and display points $q_i = \{q_{i,x}, q_{i,y}, q_{i,w}\}$. Coordinate curves $\{q_x(t), q_y(t), q_w(t)\}$ are found according to Equation (0.1), then the curve segment outline takes rational quadratic form:

$$Q_i(t) = \left\{ \frac{q_{i,x}(t)}{q_{i,w}(t)}, \frac{q_{i,y}(t)}{q_{i,w}(t)} \right\} \quad (0.2)$$

in pixel coordinates. The in or out test involves evaluating the implicit form of $q_i(t)$. Those skilled in the art will appreciate that an implicit equation in x and y may be considered to be one whose values fall on a given curve in the x-y plane Finding the implicit form of a rational quadratic curve involves the resultant of a pair of polynomials. Let $$a(t) = a_0 + a_1 t + a_2 t^2 \quad (0.3)$$

and $$b(t) = b_0 + b_1 t + b_2 t^2 \quad (0.4)$$

be a pair of polynomials in t. These polynomials will have a common root t, if Bezout's resultant $|A| = 0$, where $$A = \begin{bmatrix} a_2 b_1 - a_1 b_2 & a_2 b_0 - a_0 b_2 \\ a_2 b_0 - a_0 b_2 & a_1 b_0 - a_0 b_1 \end{bmatrix} \quad (0.5)$$

The implicit form of a quadratic curve is found by forming two new polynomials:

$$a(t) = x q_w(t) - q_x(t) \quad (0.6)$$

$$b(t) = y q_w(t) - q_y(t) \quad (0.7)$$

and taking their resultant. The zero set of the resulting equation in x and y is the implicit form of q(t).

In order to find such an implicit form for each font outline curve segment in screen space, the matrix A is formed and its determinant is taken. This result would be a quadratic polynomial in two variables x and y, represented by 6 coefficients. The evaluation of this polynomial can include 6 multiplications and 5 additions for each pixel. This may not be considered an unreasonable amount of work. However, current pixel shader implementations tend not to offer an opportunity to set state at triangle set-up time. This means that the implicit form of a quadratic curve would need to be computed at each pixel; while possible, this would tend to be computationally expensive.

FIG. 6 is an illustration of the mapping of a canonical curve element 601 from texture space 602 to screen space 603. Rather than finding the implicit equation of each curve segment in screen space 604, texture coordinates are associated with each triangle vertex $b_1$, $b_2$, $b_3$, and the implicit equation of the curve in texture space 601 is evaluated. Those skilled in the art will appreciate that texture coordinates are typically used in the mapping of a texture on to a triangle. They create a mapping from texture space to the plane defined by the points of a triangle. The following canonical texture coordinates $b_0 \leftarrow \{-1, 1\}$, $b_1 \leftarrow \{0, -1\}$, and $b_2 \leftarrow \{1, 1\}$, are assigned as shown. Those skilled in the art will realize that other texture coordinates may be selected in alternative embodiments. The canonical coordinates tend to act as a template in the derivation.

In texture space, the canonical curve segment has the form:

$$\{x,y\} = \{2t-1, (1-2t)^2\} \quad (0.8)$$

$t \in [0,1]$. By inspection, note that $$y = x^2 \quad (0.9)$$

Subtracting y from both sides of this equation, gives the implicit form of the canonical curve segment $$f(x,y) = x^2 - y. \quad (0.10)$$

It is easily verified that $$f(2t-1, (1-2t)^2) = 0 \quad (0.11)$$

Which is the desired result. Those skilled in the art will appreciate that other equations may be used in place of equation (0.10) in alternative embodiments. Since all triangles that contain a curve segment have the same texture coordinates, there is only one implicit equation to serve as an in/out test for the pixel. For the implicit curve those skilled in the art will realize that a pixel for which $f(x,y)=0$ lies on the curve, a pixel for which $f(x,y)<0$ lies inside the curve, and a pixel for which $f(x,y)>0$ lies outside the curve.

Canonical texture coordinates to the vertices of triangles that contain curve segments are assigned. In this way, the triangle rasterizer will compute the inverse mapping from screen space pixel to texture space point. Since this texture space domain is identical for each triangle containing a curve segment, only one implicit equation (0.10) need be considered. This expression is evaluated for each interpolated texture coordinate to determine if the pixel is in or out the font outline.

There are two types of triangles that contain curve segments; corresponding to triangle orientation, or the sign of $(v_0-v_1) \times (v_2-v_1)$ in model space. This tells if the curve segment is locally convex or concave. This result is encoded as an additional field in the vertex data. Pixels that are inside the curve outline are shaded by combining the in/out test with the triangle orientation (convex or concave). Those pixels that fail this test are outside the outline and write no data to the image or depth buffers.

The constraint that curve segment triangle must belong to the triangulated font outline may result in artifacts due to triangle overlap. To remove triangle overlap artifacts, curve segments may be subdivided and re-triangulated until no such overlaps exists. Anti aliasing may be provided using methods of pixel super sampling. However, more efficient techniques may be implemented utilizing variants of the current invention.

Figure 7:
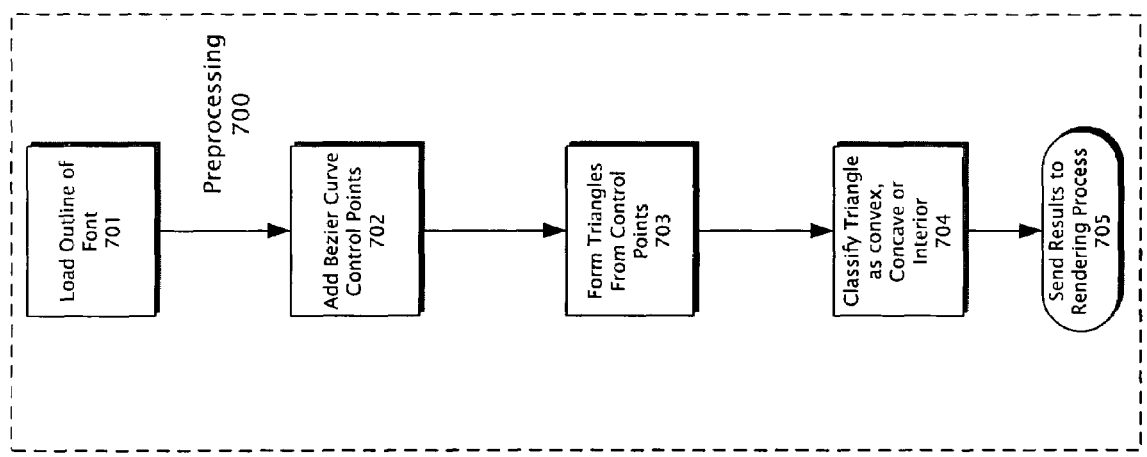
FIG. 7 is a process flow diagram showing the preprocessing process of rendering of outline fonts.

FIG. 7 is a process flow diagram showing the preprocessing process of rendering of outline fonts. At block 701 a font outline is loaded. At block 702 the Bézier control points are added to the font outline. At block 703 the outline of the font is formed into triangles utilizing the previously added control points. At block 704 the triangles are classified as either convex, concave, or interior. At block 705 the results are forwarded to the rendering process.

Figure 8:
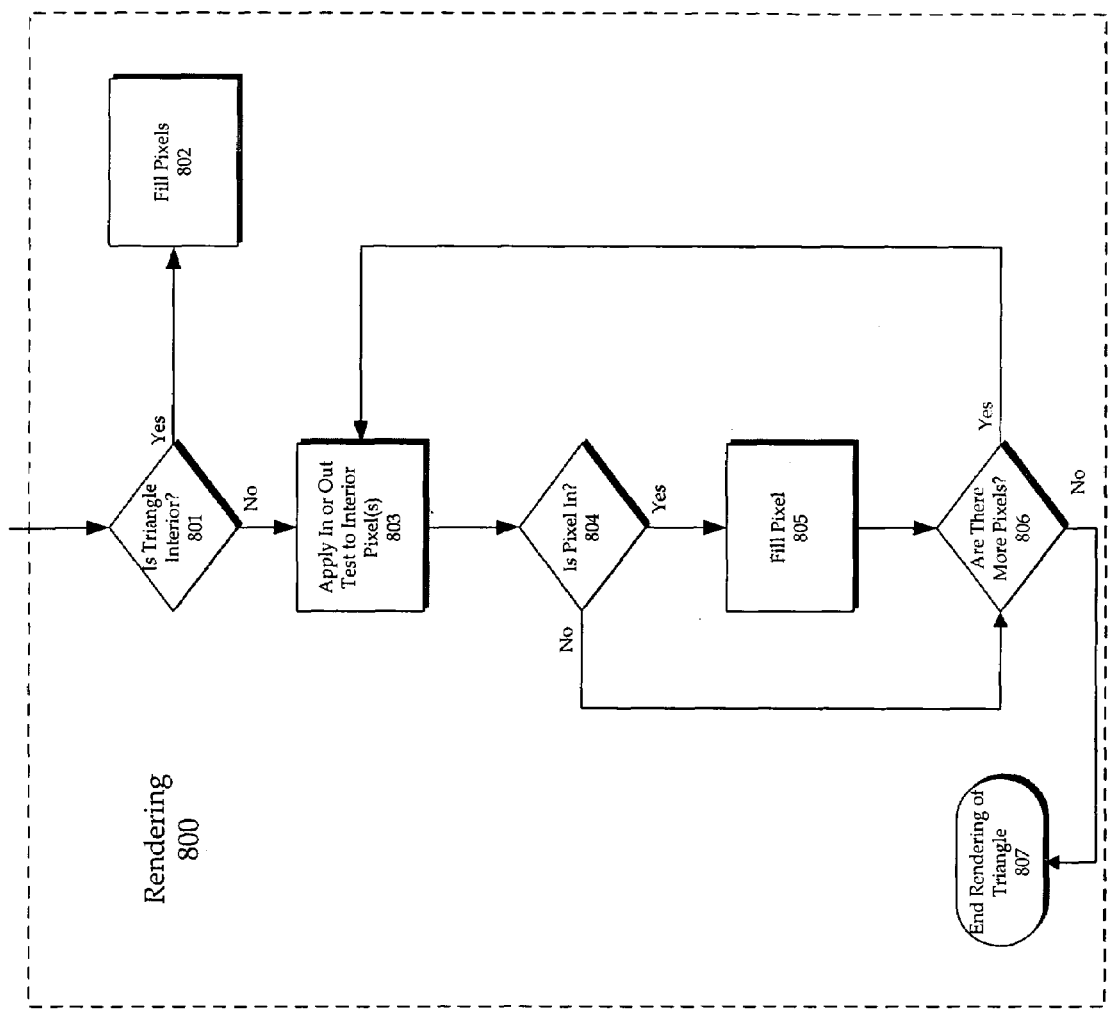
FIG. 8 is a process flow diagram showing the rendering process of rendering of outline fonts.

FIG. 8 is a process flow diagram showing the rendering process of rendering of outline fonts. The results from block 705 of FIG. 7 are input to the font rendering process 800. At block 801 an inquiry is made to determine if the particular triangle is interior. At block 802 Interior triangles have their pixels filled. If a triangle is not an interior triangle then the in or out test is applied to the pixels of the triangle at block 803. At block 804 an inquiry is made to determine if a pixel is inside. At block 806 interior pixels are filled. If the pixel is not in the process bypasses block 805, and proceeds to block 806.

At block 806 the process determines if there are more pixels. If there are the process goes back to block 803. If there are no more pixels the rendering of that particular triangle is ended. The rendering process 800 is repeated until all of the triangles that make up a particular font outline are rendered, and the font is displayed.

The invention claimed is:

1. A system for GPU Rendering of vector based fonts comprising:
 a GPU to generate a rendering of outline fonts, from a Bezier curve including implied on curve points and a font rasterization controlled by an in or out test, in a pixel pipeline, the in or out test comprising determining a location of a pixel as at one of an interior or an exterior of an outline of the outline font based on a relationship between a parametric form and implicit form of a rational quadratic curve, the generation of a rendering of outline fonts based on the location of the nixel being at the interior or exterior of the outline;
 a CPU coupled to the GPU to control the GPU and coordinate processing; and
 a memory coupled to the CPU and GPU.

2. The system for GPU Rendering of vector based fonts of claim 1, further comprising a display device coupled to the graphics pipeline on which the outline fonts, generated from the Bezier curve including implied on curve points and having font rasterization controlled by an in or out test may be displayed.

3. The system for GPU Rendering of vector based fonts of claim 1, in which the GPU includes a pixel shader programmed to contribute to the generation of an outline font in the graphics pipeline by applying an in or out test.

4. The system of claim 1 wherein the GPU further defines a plurality of outline points in model space that correspond to a curve segment outline in model space, associates a plurality of texture coordinates with each vertex of a triangle formed to approximate a curve segment outline, and assigns canonical texture coordinates to a vertice of the triangle.

5. The system of claim 4 wherein the GPU further determines an implicit form of a canonical curve segment of the form $f(x,y)=y^2-y$ and evaluates the canonical curve segment as an in or out test for a pixel, the x and y coordinates associated with a form of the canonical curve segment.

6. The system of claim 1 wherein the GPU excludes the pixel from the rendering of the outline font if the pixel is assigned to the exterior of the screen space projection of the outline font relative to the curve segment based on the in or out test; otherwise, the GPU renders the pixel in the outline font.

7. A method of rendering an outline font comprising:
 identifying a pixel associated with the outline font;
 determining a relative location of the pixel in a screen space projection of the outline font with respect to a curve segment of the outline font based on an in or out test, the in or out test being based on a relationship between a parametric and an implicitized rational quadratic curve corresponding to the outline font;

assigning the pixel to one of an interior or exterior of the screen space projection of the outline font relative to the curve segment based on the in or out test;

rendering the outline font based on the assigning; and outputting the rendered outline font.

8. The method of claim 7 wherein the outline font includes outline points comprising an off-curve point and at least one on-curve point, the method further comprising triangulating the outline font into at least one triangle corresponding to the outline points.

9. The method of claim 8 wherein the outline font further includes a curve segment within the at least one triangle.

10. The method of claim 9 wherein the step of rendering includes excluding the pixel from the rendering of the outline font if the pixel is assigned to the exterior of the screen space projection of the outline font relative to the curve segment based on the in or out test; otherwise, rendering the pixel in the outline font.

11. The method of claim 9 wherein the curve segment of the outline font is defined by the following equation in parametric form:

$$B_i(t)=b_{i-1}(1-t)^2+2b_i(1-t)t+b_{i+1}t^2$$

wherein $b_i$ corresponds to the off-curve point, $b_{i-1}$ and $b_{i+1}$ correspond to at least one off-curve point, and $t \in [0,1]$.

12. The method of claim 9 wherein the step of determining a relative location of the pixel further includes transforming the outline points to the screen space via a projective transform to generate screen space points.

13. The method of claim 12 wherein the step of determining a relative location of the pixel further includes generating a coordinate curve in a rational quadratic form of the screen space points.

14. The method of claim 13 wherein the rational quadratic form of the coordinate curve is defined in pixel coordinates by the following equation:

$$Q_i(t) = \left\{ \frac{q_{i,x}(t)}{q_{i,w}(t)}, \frac{q_{i,y}(t)}{q_{i,w}(t)} \right\}$$

wherein $q_{i,x}, q_{i,y}$, and $q_{i,w}$ represent the screen space points.

15. The method of claim 14 wherein the step of determining further includes: implicitizing the rational quadratic form of the coordinate curve by generating a resultant of a plurality of polynomials associated with the coordinate curve including:

generating the plurality of polynomials, each of the polynomials having a common root;

generating a second plurality of polynomials based on the plurality of polynomials;

determining a resultant corresponding to the polynomials of the second plurality of polynomials; and generating a zero set of the resultant.

16. The method of claim 9 wherein the determining further includes:

assigning a texture coordinate to the outline points;

generating an implicitized canonical curve segment in texture space based on the texture coordinate.

17. The method of claim 16 wherein the step of generating an implicitized canonical curve segment includes:

identifying a canonical curve segment in texture space, the canonical curve segment being in an X-Y plane and having the form $\{x,y\}=\{2t-1,(1-2t)^2\}$, wherein $t \in [0, 1]$; and implicitizing the canonical curve segment in the form $f(x,y)=x^2-y$.

18. The method of claim 17 wherein the implicitized canonical curve segment is further represented by the following equation:

$$f(x,y)=x^2-y=f(2t-1, (1-2t)^2).$$

19. The method of claim 17 wherein the step of determining a relative location of the pixel includes identifying the pixel as on the curve segment of the outline font when $f(x,y)=0$, inside the curve segment when $f(x,y)<0$, and outside the curve segment when $f(x,y)>0$.

20. The method of claim 19 wherein the rendering step includes rendering the pixel if the pixel is identified as inside the curve segment or on the curve segment, otherwise omitting the pixel.

* * * * *